W. E. LANE.
Stench-Trap.
No. 214,302.     Patented April 15, 1879.
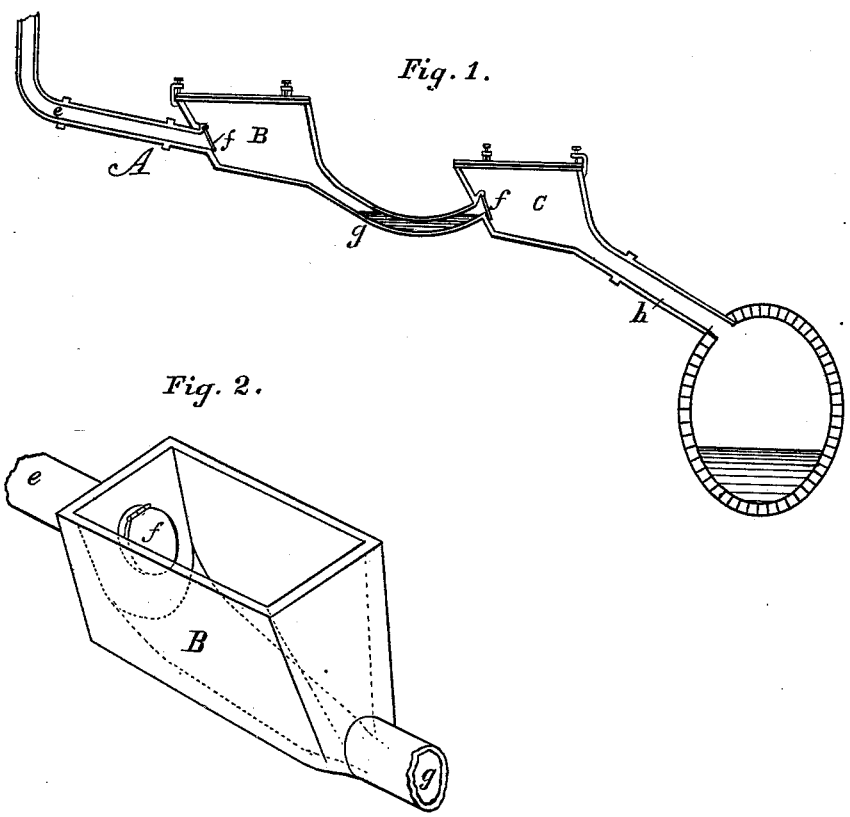

UNITED STATES PATENT OFFICE.

WILLIAM E. LANE, OF SAN FRANCISCO, CALIFORNIA.

IMPROVEMENT IN STENCH-TRAPS.

Specification forming part of Letters Patent No. 214,302, dated April 15, 1879; application filed January 27, 1879.

*To all whom it may concern:*

Be it known that I, WILLIAM E. LANE, of the city and county of San Francisco, and State of California, have invented an Improved Stench-Trap; and I do hereby declare that the following is a full, clear, and exact description thereof, reference being had to the drawings accompanying this specification and forming a part of the same.

My invention has reference to an improved arrangement of traps for preventing the foul gases which are generated in sewers from passing into houses through the waste-pipes which connect sinks, wash-bowls, and water-closets with the sewer.

My invention consists in the construction and arrangement of the parts composing my improved stench-trap, as fully hereinafter explained.

Referring to the accompanying drawings, Figure 1 is a section of stench-trap, showing connections with house and main sewer. Fig. 2 is an isometrical perspective view of one chamber, showing inlet-pipe.

Let A represent the waste-pipe or side sewer which leads from the house to the main sewer. In the length of this pipe or sewer I insert a length or section of which my improved trap and valves form a part.

In the present instance I have represented two valve-chambers, B C; but a single chamber can be used. The particular form or shape of the chamber is immaterial; but I shall usually make them, as represented in the drawings, with a round bottom and flat top, and the bottom I will make gradually narrower toward the discharge end. The ends of the chambers I will make at an angle and parallel, so that the discharge end will narrow toward the outlet-opening like a funnel, so as to direct everything toward the discharge or outlet pipe, which communicates with this end at the bottom of the chamber. Both of the chambers B C are made exactly alike.

The inlet-pipe e, which conducts the sewage from the house, enters the first chamber, B, midway between the top and bottom of the chamber, and its extremity is covered by a hinged or flap valve, f, inside the chamber. The end of the chamber being inclined, the valve will close automatically upon its inclined seat, so as to cover the end of the pipe. When I use two chambers I connect them by a bend or trap pipe, g, which enters the lower corner of the first chamber, B, and enters the end of the second chamber, C, midway between its top and bottom, in the same manner that the pipe e enters the first chamber. The end of this pipe is also covered by a hinged or flap valve inside of the chamber, which closes automatically upon the inclined seat, as above described. The discharge-pipe h, which leads to the main sewer, connects with the second chamber at its bottom, as shown.

This arrangement gives the proper grade or inclination to the section, so that the water and matter which enter the chambers are immediately discharged through the outlet-pipe.

The connecting pipe or trap g will remain full of water, and it is impossible for it to siphon out, because a sufficient vacuum cannot be created in the chamber by the outflow of water, as the water will flow slowly through the pipes without any strong pressure.

The valves f, which cover the ends of the inlet-pipe, prevent the gases from the sewer from passing back through the pipe.

The tops or covers of the chambers can be made removable, or suitable covered hand-holes can be arranged to admit of clearing out the chambers when necessary or repairing the valves. When I use a single chamber I trap the pipe before it enters the chamber.

This arrangement effectually prevents the passage of foul gas from the sewer to the house, but allows a clear and free passage of the sewage to the main sewer.

Having thus described my invention, what I claim, and desire to secure by Letters Patent, is—

A stench-trap consisting of the chambers B C, of the form shown, the inlet and outlet pipes, the curved connecting-pipe g, forming a water-seal, and the automatically-closing valves f, all constructed and arranged substantially as described and set forth.

In witness whereof I hereunto set my hand and seal.

W. E. LANE. [L. S.]

Witnesses:
 D. B. LAWLER,
 WILL B. SCHWARTZ.